(12) United States Patent
Takasuka et al.

(10) Patent No.: US 10,025,169 B2
(45) Date of Patent: Jul. 17, 2018

(54) GRASPING TOOL AND PROJECTOR

(71) Applicant: Seiko Epson Corporation, Tokyo (JP)

(72) Inventors: Hideki Takasuka, Matsumoto (JP); Takahiro Totsuka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/400,404

(22) Filed: Jan. 6, 2017

(65) Prior Publication Data

US 2017/0205690 A1 Jul. 20, 2017

(30) Foreign Application Priority Data

Jan. 19, 2016 (JP) .................................. 2016-007670
Oct. 27, 2016 (JP) .................................. 2016-210303

(51) Int. Cl.
*G03B 21/14* (2006.01)
*A45F 5/10* (2006.01)

(52) U.S. Cl.
CPC .............. *G03B 21/145* (2013.01); *A45F 5/10* (2013.01)

(58) Field of Classification Search
CPC ........ F16M 11/10; F16M 16/02; F16M 13/00; F16M 11/22; A45F 5/10; G03B 21/14; G03B 21/00; H04N 5/64
See application file for complete search history.

(56) References Cited

U.S. PATENT DOCUMENTS

| 2010/0045947 A1 | 2/2010 | Nakanishi et al. |
| 2015/0198868 A1* | 7/2015 | Sakurai ............... G03B 21/145 353/119 |

FOREIGN PATENT DOCUMENTS

| JP | 9-326569 A | 12/1997 |
| JP | 2011-018061 A | 1/2011 |

OTHER PUBLICATIONS

Panasonic, "Spec File—Carrying Handle ET-HAD100," Dec. 2006, p. 1.
Barco, "FLM/HDF Carrying Handle," Installation Manual, Belgium, Jun. 17, 2015, pp. 1-7.

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A grasping tool which is attached to a device includes: a main body which is provided with two extending portions extending out in substantially the same direction and a connecting portion that connects respective one-side ends of the two extending portions; and a reinforcement portion that connects and reinforces a position different from that of the connecting portion, in the two extending portions. The main body and the reinforcement portion include an attachment portion that attaches the grasping tool to the device.

16 Claims, 12 Drawing Sheets

GRASPING TOOL AND PROJECTOR

CROSS-REFERENCE TO RELATED APPLICATION

The entire disclosure of Japanese Patent Application No. 2016-007670, filed Jan. 19, 2016 and No. 2016-210303, filed Oct. 27, 2016 is expressly incorporated by reference herein.

BACKGROUND

1. Technical Field

The present invention relates to a grasping tool and a projector.

2. Related Art

Hitherto, a handle for a portable apparatus provided in a portable apparatus such as a liquid crystal projector has been known (see, for example, JP-A-09-326569).

Each of the right and left sides of the upper surface of the portable apparatus disclosed in JP-A-09-326569 is provided with a recessed portion, and the recessed portion is provided with a handle formed in a substantially lateral U-shape. Thereby, the handle is grasped by one or two persons depending on the weight of the portable apparatus such as the liquid crystal projector, thereby allowing the portable apparatus to be transported.

Incidentally, the handle for a portable apparatus (grasping tool) disclosed in JP-A-09-326569 is often provided in the substantially central portion of the portable apparatus, and the handle has as large a size as can be grasped by one person (as large a size as a fist). Therefore, even in a case where the weight of the portable apparatus such as a projector is equivalent to one or more adults, the portable apparatus is required to be transported by one or two persons when the grasping tool is used. In such a case, it is very difficult for one or two persons to transport the portable apparatus. In a case where the portable apparatus is transported by four persons, the grasping tool can be grasped by only two persons. That is, since at least two other persons are not able to grasp the grasping tool, there is a problem in that the portable apparatus is not able to be easily transported.

That is, a grasping tool and a projector are needed which are capable of being simultaneously grasped by three or more persons, and which are capable of easily transporting a portable apparatus (device) such as a projector.

SUMMARY

An advantage of some aspects of the invention is to provide a grasping tool and a projector which are capable of easily transporting a device such as a projector.

A grasping tool according to a first aspect of the invention is a grasping tool which is attached to a device and includes: a main body which is provided with two extending portions extending out in substantially the same direction and a connecting portion that connects respective one-side ends of the two extending portions; and a reinforcement portion that connects and reinforces a position different from that of the connecting portion, in the two extending portions. The main body and the reinforcement portion include an attachment portion that attaches the grasping tool to the device.

In the first aspect, when the grasping tool is mounted on the device by the attachment portion of the grasping tool, two extending portions and the connecting portion are located in three different directions of the device, and thus the two extending portions and the connecting portion which are located in the three directions can be grasped by a plurality of users (for example, three or more users). According to this, even in a case where the weight of the device is equivalent to one or more adults, the grasping portion can be grasped and transported by three or more users, and thus it is possible to easily transport the device.

In addition, for example, in a case where the device is a projector, and the device is provided with a projection optical device, mounting the grasping tool on the device so that the projection optical device is located on the opposite side of the connecting portion does not cause the main body of the grasping tool to be located in the projection direction of the projection optical device, and thus it is possible to reliably project a projection image projected from the projection optical device onto a projection surface.

Further, since the reinforcement portion that connects a position different from that of the connecting portion is included in two extending portions extending out in substantially the same direction, it is possible to further improve the durability of the grasping tool than in a case where the reinforcement portion is not included.

In the first aspect, it is preferable that the main body includes a curved portion which is curved in a direction away from the device.

Here, it is more preferable that the curved portion is disposed at a position closer to the center side than to the end of the main body.

According to the first aspect with this configuration, the curved portion provided in at least a portion of the main body is curved in a direction separated from the device. Therefore, since a gap between the curved portion and the device becomes larger, a plurality of users grasp a portion having the large gap, and thus can easily transport the device.

On the other hand, in a case where the curved portion is disposed at a position closer to the center side than to the end of the main body, a user can grasp a position closer to the end side than to the curved portion, and thus can easily grasp the grasping tool.

In the first aspect, it is preferable that the device includes a plurality of legs that come into contact with an installation surface, and that the main body includes a fixing portion that fixes the plurality of legs detached from the device.

According to the first aspect with this configuration, a plurality of legs detached from the device can be mounted on the main body. For example, in a case where the grasping tool is mounted on the ceiling portion of the device and the bottom portion thereof located in a direction opposite to that of the ceiling portion, the legs can be mounted on the grasping tool. In this case, for example, when the device is a projector, and upward projection, portrait projection or the like is executed in the projection direction of the device, the legs are mounted in regions that come into contact with the installation surface of the main body, and thus it is possible to stably project a projection image from the device.

In the first aspect, it is preferable that the device includes a metal frame body within an exterior housing, and the grasping tool is fixed to the metal frame body.

According to the first aspect with this configuration, since the grasping tool is fixed to the metal frame body, it is possible to fix the grasping tool to the device more reliably than in a case where the grasping tool is fixed to an exterior housing constituted of, for example, a synthetic resin or the like. Therefore, it is possible to suppress damage to the exterior housing of the device during transport of the device, release from fixation between the device and grasping tool, and damage to the device due to its falling or the like.

A projector according to a second aspect of the invention is a projector including: a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool. The exterior housing includes a bottom portion facing an installation surface of the projector, and a ceiling portion which is located on an opposite side of the bottom portion, and the grasping tool is attached to at least one of the ceiling portion and the bottom portion.

According to the second aspect, it is possible to exhibit the same effect as that of the grasping tool according to the first aspect. In addition, since the grasping tool is attached to at least any one of the ceiling portion and the bottom portion of the device, it is possible to select a position at which the grasping tool is mounted, in accordance with the application of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to accompanying drawings.
Schematic Configuration of Projector FIG. 1 is a perspective view of the outward appearance of the projector 1 according to the present embodiment, and FIG. 2 is a schematic diagram illustrating a configuration of a device 10 constituting the projector 1.

Figure 1:
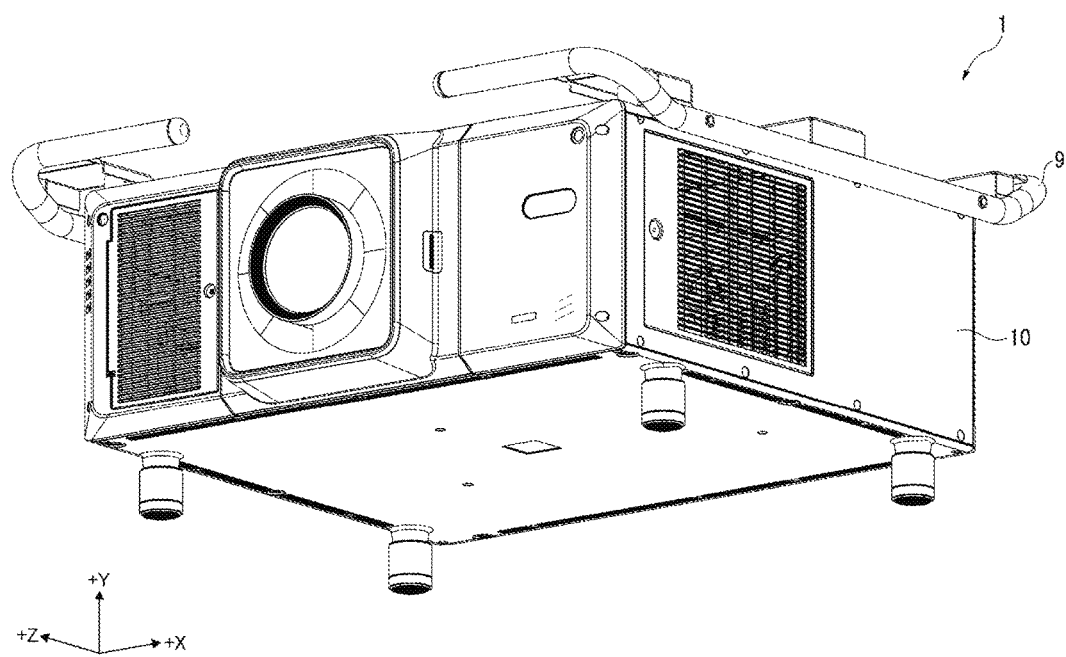
FIG. 1 is a perspective view of the outward appearance of a projector according to an embodiment of the invention.
Figure 2:
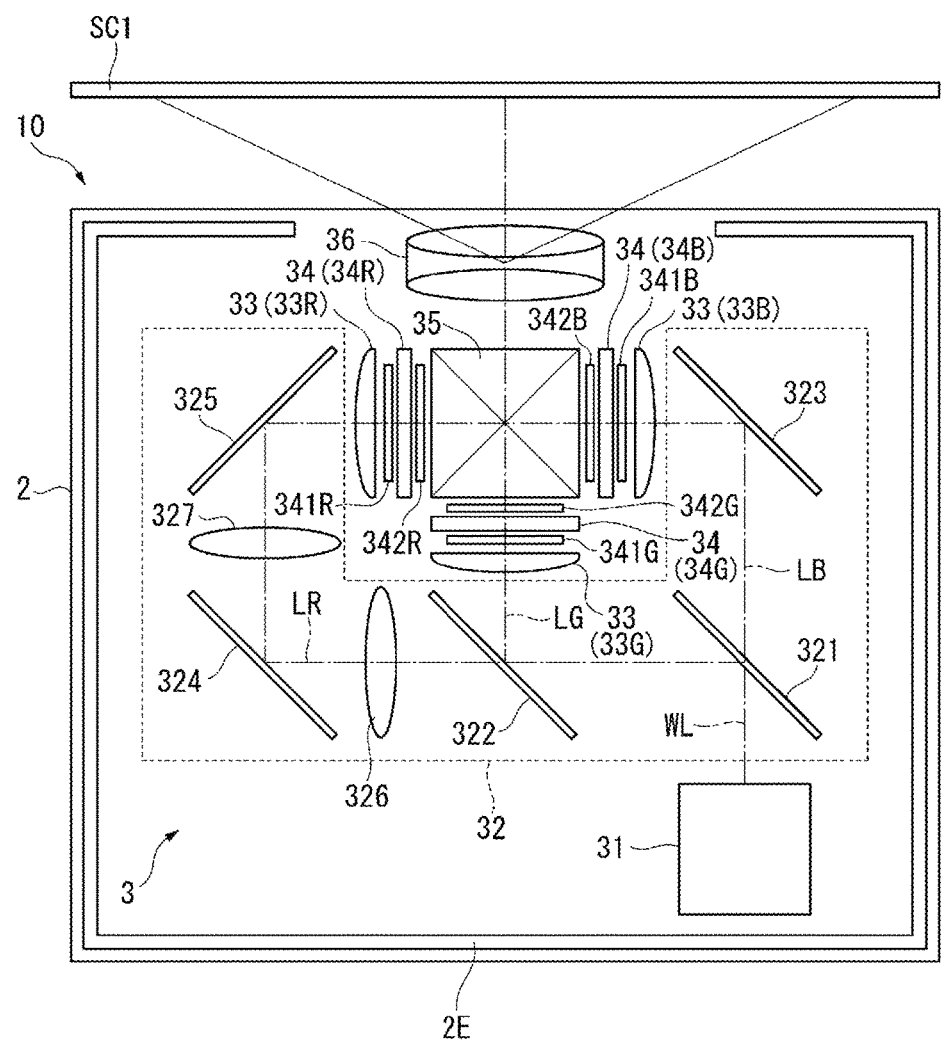
FIG. 2 is a schematic diagram illustrating a schematic configuration of the projector according to the embodiment.

As shown in FIGS. 1 and 2, the projector 1 is a display device that modulates a flux of light emitted from a light source provided therein to form an image based on image information, and extendedly projects the image on a projection surface such as a screen SC1. Such a projector 1 is constituted by the device 10 and a handle 9 which is attached to the device 10.

The configuration of the handle 9 will be described later.

As shown in FIG. 2, this device 10 includes an exterior housing 2 and an optical unit 3 which is received within the exterior housing 2, and additionally includes a control device that controls the device 10, a cooling device that cools a cooling target, and a power supply device that supplies power to electronic parts constituting the device 10 which are not shown in the drawing.

In addition, a metal frame body 2E is received within the exterior housing 2. The exterior housing 2 and the metal frame body 2E will be described later in detail.
Configuration of Optical Unit The optical unit 3 includes a light source device 31, a color separation device 32, collimating lenses 33, a plurality of light modulation devices 34, a color synthesis device 35, and a projection optical device 36.

The light source device 31 includes a laser light source that emits blue light and a phosphor or the like that converts light emitted from the laser light source into fluorescent light, and emits illumination light WL from the light source device 31.

The color separation device 32 separates the illumination light WL incident from the light source device 31 into three beams of colored light of red light LR, green light LG and blue light LB. This color separation device 32 includes dichroic mirrors 321 and 322, total reflection mirrors 323, 324, and 325 and relay lenses 326 and 327.

The dichroic mirror 321 separates the blue light LB and light including the other colored light (green light LG and red light LR) from the illumination light WL emitted from the light source device 31. The dichroic mirror 321 transmits the blue light LB, and reflects the light including the green light LG and the red light LR.

The dichroic mirror 322 separates the green light LG and the red light LR from the light separated by the dichroic mirror 321. Specifically, the dichroic mirror 322 reflects the green light LG, and transmits the red light LR.

The total reflection mirror 323 is disposed in an optical path of the blue light LB, and reflects the blue light LB transmitted by the dichroic mirror 321 toward the light modulation device 34(34B). On the other hand, the total reflection mirrors 324 and 325 are disposed in an optical path of the red light LR, and reflects the red light LR having passed through the dichroic mirror 322 toward the light modulation device 34(34R). In addition, the green light LG is reflected toward the light modulation device 34(34G) by the dichroic mirror 322.

The relay lenses 326 and 327 are disposed downstream of the dichroic mirror 322 in the optical path of the red light LR. These relay lenses 326 and 327 have a function of compensating for a light loss of the red light LR due to the optical path length of the red light LR becoming larger than the optical path length of the blue light LB or the green light LG.

The collimating lenses 33 collimate light which is incident on the light modulation device 34 described later. Collimating lenses for respective beams of colored light of red, green and blue are set to 33R, 33G, and 33B, respectively. In addition, light modulation devices for respective beams of colored light of red, green and blue are set to 34R, 34G, and 34B, respectively.

The plurality of light modulation devices 34 (34R, 34G, and 34B) modulate the respective beams of colored light LR, LG, and LB which are separated and incident by the dichroic mirror 321 and the dichroic mirror 322, and form a color image based on image information. These light modulation devices 34 are constituted by a liquid crystal panel that modulates light to be incident. Incident-side polarizing plates 341 (341R, 341G, and 341B) and emission-side polarizing plates 342 (342R, 342G, and 342B) are disposed on the incident sides and emission sides of the light modulation devices 34R, 34G, and 34B, respectively.

Beams of image light from the respective light modulation devices 34R, 34G, and 34B are incident on the color synthesis device 35. This color synthesis device 35 synthesizes the beams of image light corresponding to the respective beams of colored light LR, LG, and LB, and emits this synthesized image light toward the projection optical device 36. In the present embodiment, the color synthesis device 35 is constituted by a cross dichroic prism.

The projection optical device 36 projects the image light synthesized by the color synthesis device 35 onto a projection surface such as the screen SC1. With such a configuration, a magnified image is projected onto the screen SC1.

Outward Appearance of Projector

Figure 3:
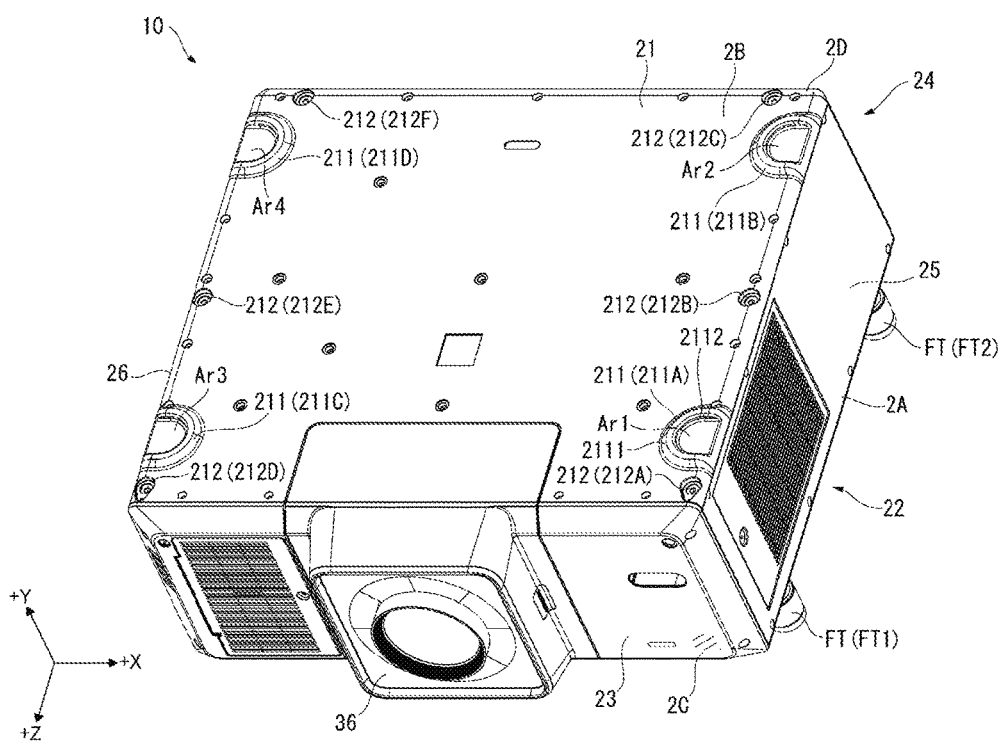
FIG. 3 is a perspective view of the outward appearance of a device in which a handle of the projector according to the embodiment is removed.

FIG. 3 is a perspective view illustrating the outward appearance of the device 10 according to the present embodiment.

As shown in FIG. 3, the exterior housing 2 of the device 10 is formed in a substantially rectangular shape, and is formed by a combination of a lower case 2A, an upper case 2B, a front case 2C and a back case 2D. The exterior housing 2 constituted by each of these cases 2A to 2D includes a ceiling portion 21, a bottom portion 22, a front portion 23, a back portion 24, a left side portion 25 and a right side portion 26. The bottom portion 22 is a surface on the opposite side of the ceiling portion 21, the right side portion 26 is a surface on the opposite side of the left side portion 25, and the front portion 23 is a surface on the opposite side of the back portion 24.

When another projector (for example, a device having the same shape as that of the projector 1 according to the present embodiment, which may be, hereinafter, referred to as a projector 1A) is stacked, the ceiling portion 21 includes four upright standing portions 211 (the respective upright standing portions may be referred to as upright standing portions 211A, 211B, 211C, and 211D) for regulating the movement of legs FT of the projector 1A, and a plurality of hole portions 212 (the respective hole portions may be referred to as hole portions 212A, 212B, 212C, 212D, 212E, and 212F) into which a screw S1 for fixing the handle 9 and the metal frame body 2E is inserted.

Figure 4:
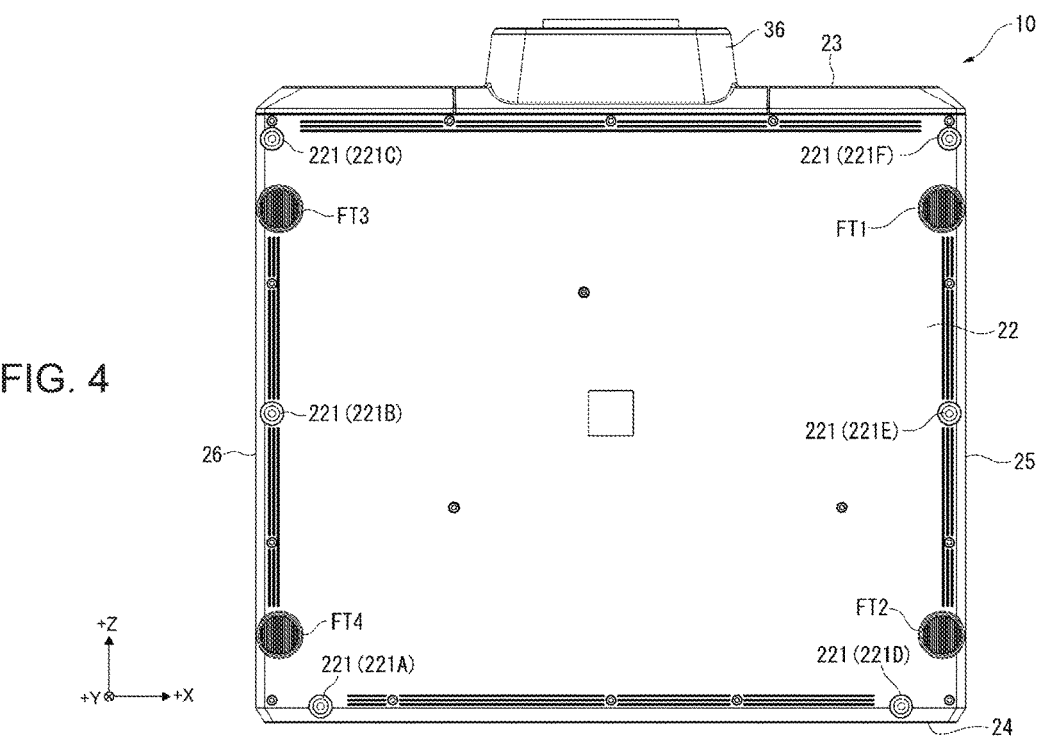
FIG. 4 is a plan view when the device according to the embodiment is seen from a bottom portion.

The bottom portion 22 includes four legs FT (the respective legs may be referred to as legs FT1, FT2, FT3, and FT4) which come into contact with an installation surface when the projector 1 is installed on the installation surface, and a plurality of hole portions 221 (the respective hole portions may be referred to as hole portions 221A, 221B, 221C, 221D, 221E, and 221F) into which the screw S1 for fixing the handle 9 and the metal frame body 2E is inserted (see FIG. 4).

In addition, a portion of the projection optical device 36 is exposed to the substantially central portion of the front portion 23 through an opening (not shown), and the image is projected by the projection optical device 36.

In the following description, the traveling direction of light which is emitted from the light source device 31 is set to a +Z direction, and directions which are orthogonal to the +Z direction and are orthogonal to each other are set to a +X direction and a +Y direction. In the present embodiment, since the +Z direction is a direction toward the front portion 23 from the back portion 24, the +Y direction is set to a direction from the bottom portion 22 toward the ceiling portion 21, and the +X direction is set to a direction from the right side portion 26 toward the left side portion 25. That is, when the projector 1 is seen in a plan view from the ceiling portion 21 side, the +X direction is set to a direction substantially orthogonal to the projection direction of the image projected by the projection optical device 36.

Configuration of Upright Standing Portion

As shown in FIG. 3, the ceiling portion 21 includes upright standing portions 211A, 211B, 211C, and 211D. When another projector 1A is stacked on the projector 1, each of these upright standing portions 211A to 211D regulates the movement of legs FT of the another projector 1A. Therefore, each of the upright standing portions 211A to 211D is provided in the vicinity of areas Ar1, Ar2, Ar3, and Ar4 in which the legs FT of another projector 1A in the ceiling portion 21 are disposed.

These upright standing portions 211A to 211D are provided along the outer edge of the ceiling portion 21. Specifically, the upright standing portions 211A and 211B are provided along one side on the +X direction side constituting the outer edge of the ceiling portion 21, and the upright standing portions 211C and 211D are provided along one side on the −X direction side constituting the outer edge of the ceiling portion 21.

In addition, the upright standing portion 211A is located on the +Z direction side of the one side on the +X direction side, and the upright standing portion 211B is located on the −Z direction side of the one side. That is, the upright standing portions 211A and 211B are provided in the vicinity of both ends of one side on the +X direction side constituting the outer edge of the ceiling portion 21. On the other hand, the upright standing portion 211C is located on the +Z direction side of the one side on the −X direction side, and the upright standing portion 211D is located on the −Z direction side of the one side. That is, the upright standing portions 211C and 211D are provided in the vicinity of both ends of one side on the −X direction side constituting the outer edge of the ceiling portion 21.

Each of these upright standing portions 211A to 211D includes a main body 2111 and an inclined surface 2112. The main body 2111 is an upright standing portion protruding from the ceiling portion 21 in a direction (+Y direction) away from the ceiling portion, and is formed in a substantially U-shape (substantially semicircular shape). In other words, the main body 2111 has a shape along a portion of the circumference of a cylindrical leg FT described later, and has a shape which is open toward the outer edge of the ceiling portion 21.

Configuration of Leg

FIG. 4 is a plan view when the projector 1 is seen from the −Y direction side.

As shown in FIG. 4, the bottom portion 22 includes four legs FT (legs FT1, FT2, FT3, and FT4) which come into contact with the installation surface when the projector 1 is installed on the installation surface. Each of these legs FT1 to FT4 is formed in a substantially cylindrical shape, and is provided along the outer edge of the bottom portion 22. Specifically, the legs FT1 to FT4 are provided at positions corresponding to the respective areas Ar1 to Ar4 surrounded by the upright standing portions 211A to 211D. Therefore, in a case where another projector 1A having the same shape is stacked on the ceiling portion 21 of the device 10, each of the legs FT1 to FT4 of the another projector 1A is engaged with each of the upright standing portions 211A to 211D, and thus is disposed in each of the areas Ar1 to Ar4 in a state where the movement thereof is regulated (see FIG. 12).

Each of the legs FT1 to FT4 is screw-fixed to the metal frame body 2E described later through a hole portion (not shown) provided in the bottom portion 22. In addition, in each of the legs FT1 to FT4, the amount of threading into the metal frame body 2E and the position of a projection image projected from the projectors 1 and 1A can be adjusted by the rotation operation of a screw.

Configuration of Metal Frame Body

Figure 5:
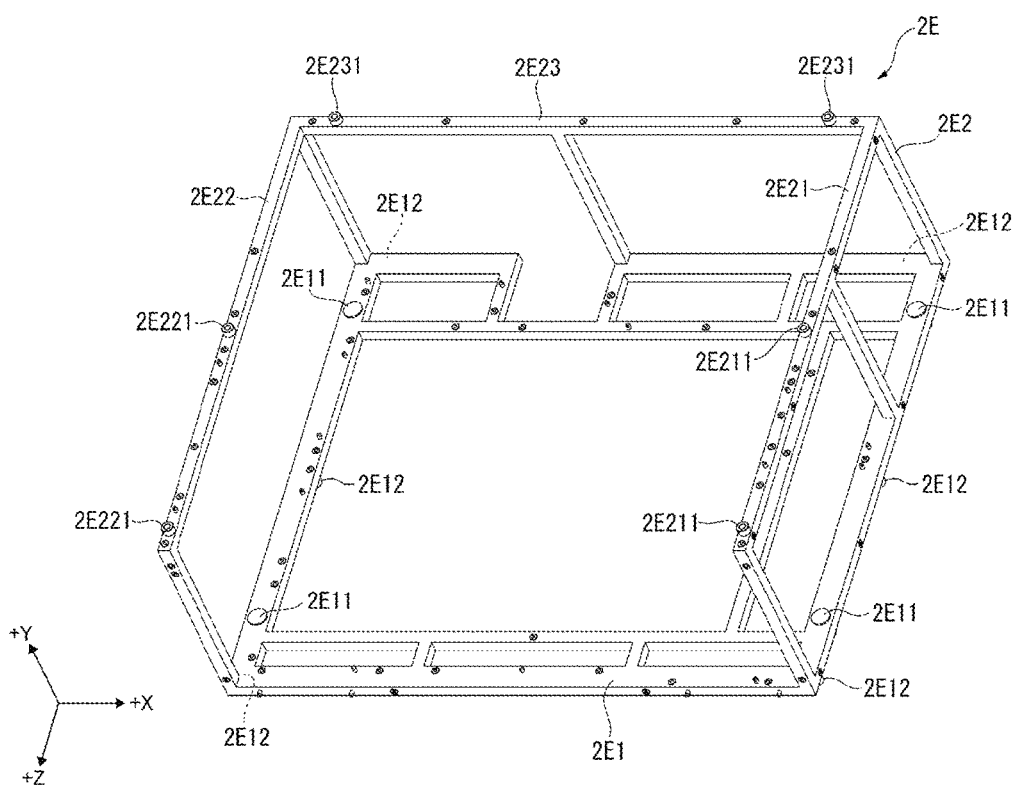
FIG. 5 is a perspective view of a metal frame body which is disposed within an exterior housing according to the embodiment.

FIG. 5 is a perspective view when the metal frame body 2E disposed within the exterior housing 2 is seen from the +Z direction side.

The metal frame body 2E is disposed within the exterior housing 2, and has a function of improving the strength of the exterior housing 2. This metal frame body 2E includes a first frame portion 2E1 having a substantially rectangular shape and a second frame portion 2E2 having a substantially U-shape. The first frame portion 2E1 out of the frame portions is a member which is disposed at a position facing the bottom portion 22 within the exterior housing 2. This first frame portion 2E1 is provided with four engagement portions 2E11 to which the legs FT1 to FT4 are fixed, respectively.

Specifically, the end of the first frame portion 2E1 on the +X direction side is provided with two engagement portions 2E11 to which the legs FT1 and FT2 are fixed, and the end of the first frame portion 2E1 on the −X direction side is provided with two engagement portions 2E11 to which the legs FT3 and FT4 are fixed. These engagement portions 2E11 have a shape of threaded engagement with screw portions (not shown) protruding from the legs FT1 to FT4, and the screw portions are threadedly engaged with the engagement portions 2E11. Thereby, each of the legs FT1 to FT4 is movably fixed to the metal frame body 2E (first frame portion 2E1) in a direction along the +Y direction.

The second frame portion 2E2 is a substantially U-shaped member which protrudes from the outer edge of the first frame portion 2E1 in the +Y direction, and in which an end where the projection optical device 36 is disposed is opened. This second frame portion 2E2 is disposed at a position facing the ceiling portion 21 within the exterior housing 2.

This second frame portion 2E2 includes a left frame portion 2E21, a right frame portion 2E22, and a middle frame portion 2E23. The left frame portion 2E21 out of these frame portions is located on the left side portion 25 side, and is disposed at a position facing the areas Ar1 and Ar2 of the ceiling portion 21 in which the legs FT1 and FT2 of another projector 1A are stacked.

In addition, the right frame portion 2E22 is located at the right side portion 26 side, and is disposed at a position facing the areas Ar3 and Ar4 of the ceiling portion 21 in which the legs FT3 and FT4 of another projector 1A are installed. That is, since the metal frame body 2E (second frame portion 2E2) is disposed at a position facing the areas Ar1 to Ar4 of the ceiling portion 21, the weight of the another projector can be supported by the metal frame body 2E.

The surface on the −Y direction side of the end of the first frame portion 2E1 on the +X direction side is provided with three protruding portions 2E12 which protrude from the surface to the −Y direction side, and to which the handle 9 described later is attached. In addition, the surface on the −Y direction side of the end of the first frame portion 2E1 on the −X direction side is provided with three protruding portions 2E12 which protrude from the surface to the −Y direction side, and to which the handle 9 is attached. These protruding portions 2E12 are provided at positions corresponding to the plurality of hole portions 221, and have a shape of threaded engagement with the screw S1 attached through the handle 9. Thereby, the handle 9 is attached and fixed to the metal frame body 2E through the bottom portion 22.

In addition, the surface of the left frame portion 2E21 on the +Y direction side is provided with two protruding portions 2E211 which protrude from the surface to the +Y direction side. Further, the surface of the right frame portion 2E22 on the +Y direction side is provided with two protruding portions 2E221 which protrude from the surface to the +Y direction side. Additionally, the surface of the middle frame portion 2E23 on the +Y direction side is provided with two protruding portions 2E231 which protrude from the surface to the +Y direction side.

These protruding portions 2E211, 2E221, and 2E231 are provided at positions according to the plurality of hole portions 212. In addition, similarly to the protruding portion 2E12, these protruding portions 2E211, 2E221, and 2E231 have a shape of threaded engagement with the screw S1 attached through the handle 9, and the screw S1 is threadedly engaged with each of the protruding portions 2E211, 2E221, and 2E231. Thereby, the handle 9 is attached and fixed to the metal frame body 2E through the ceiling portion 21.

Configuration of Handle

Figure 6:
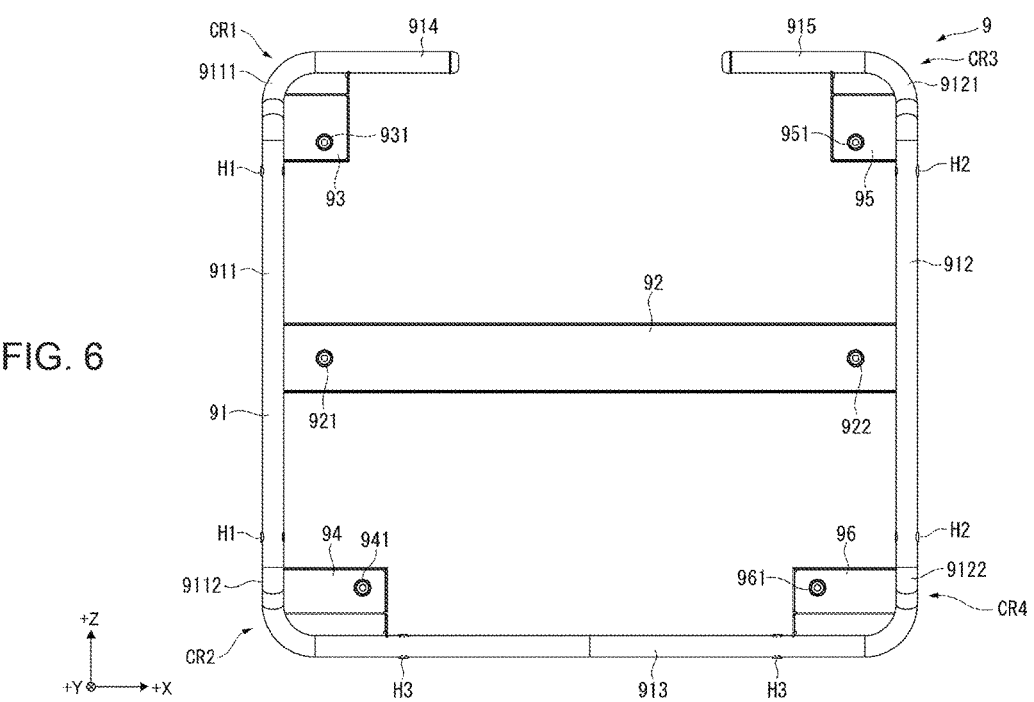
FIG. 6 is a plan view of a handle which is attached to the device according to the embodiment.
Figure 7:
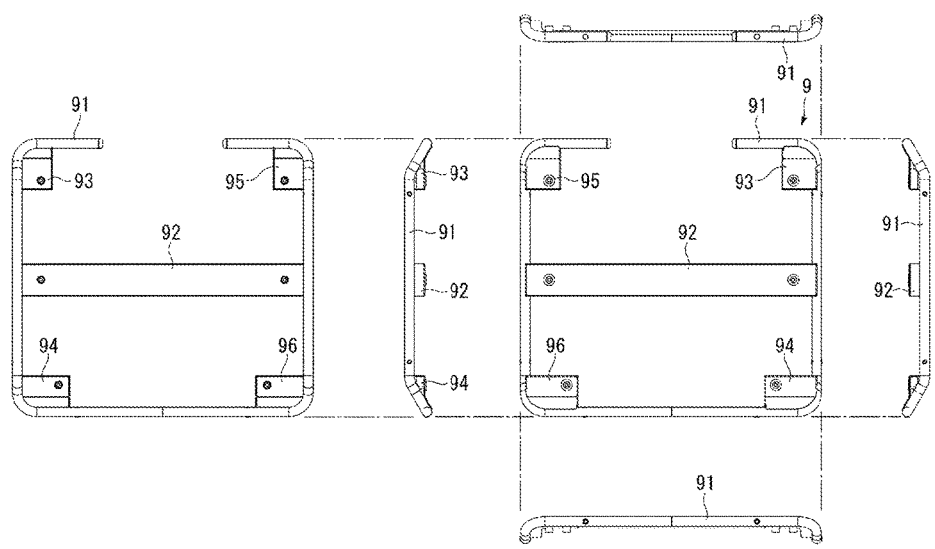
FIG. 7 is a six-sided view of the handle according to the embodiment.

FIG. 6 is a plan view of the handle 9 constituting the projector 1 according to the present embodiment, and FIG. 7 is a six-sided view of the handle 9. In the following description relating to the configuration of the handle 9, each direction of +X, +Y, and +Z is premised on a case where the handle 9 is attached to the metal frame body 2E through the ceiling portion 21 (first attachment aspect described later; see FIG. 1).

The handle 9 is equivalent to a grasping tool according to the invention, is mounted on the device 10, and constitutes the projector 1. As shown in FIGS. 6 and 7, this handle 9 includes a main body 91, a reinforcement portion 92, and plate-like portions 93, 94, 95, and 96.

The main body 91 is a region which is grasped by a plurality of users, and includes a first extending portion 911, a second extending portion 912, a connecting portion 913, a third extending portion 914, and a fourth extending portion 915. The first extending portion 911 and the second extending portion 912 out of the extending portions are regions extending out in substantially the same direction, and have a shape extending out in the +Z direction in parallel to each other. In addition, the connecting portion 913 connects the end of the first extending portion 911 on the −Z direction side and the end of the second extending portion 912 on the −Z direction side.

On the other hand, the third extending portion 914 extending in the −X direction is connected to the end of the first extending portion 911 on the +Z direction side, and the fourth extending portion 915 extending in the +X direction is connected to the end of the second extending portion 912 on the +Z direction side. A gap slightly larger than the dimension of the projection optical device 36 in a direction along the X direction is provided between the third extending portion 914 and the fourth extending portion 915. That is, the main body 91 is formed by a hollow metal pipe being machined in a substantially U-shape, and is formed in a substantially U-shape.

In other words, a portion of the main body 91 has an opened shape, and is installed so that when the handle 9 is attached to the device 10, the opened portion is located on the projection optical device 36 side of the device 10. Thereby, an image which is projected from the projection optical device 36 is not affected by the handle 9 (main body 91).

In addition, the main body 91 is provided with four corners CR1 to CR4 on the basis of the above configuration, and includes four curved portions 9111, 9112, 9121, and 9122 which are curved on the +Y direction side in the vicinity of the corners CR1 to CR4. Specifically, the curved portion 9111 located in a region of connection between the first extending portion 911 and the third extending portion 914 is curved in the +Y direction toward the +Z direction, and the curved portion 9112 located in a region of connection between the first extending portion 911 and the connecting portion 913 is curved in the +Y direction toward the −Z direction.

Similarly, the curved portion 9121 located in a region of connection between the second extending portion 912 and the fourth extending portion 915 is curved in the +Y direction toward the +Z direction, and the curved portion 9122 located in a region of connection between the second extending portion 912 and the connecting portion 913 is curved in the +Y direction toward the −Z direction. That is, when the handle 9 is attached to the device 10, the connecting portion 913, the third extending portion 914, and the fourth extending portion 915 are set so as to be located closer to the +Y direction side (direction side away from the device 10) than the first extending portion 911 and the second extending portion 912. In other words, the vicinities of four corners CR of the main body 91 are set so as to be located closer to the +Y direction side (side away from the device 10) than the first extending portion 911 and the second extending portion 912.

Thereby, since a gap between the device 10, and the connecting portion 913, the third extending portion 914 and the fourth extending portion 915 becomes larger, a region having the large gap is easily grasped by a plurality of users.

In addition, two hole portions H1 are formed in the first extending portion 911, two hole portions H2 are formed in the second extending portion 912, and two hole portions H3 are formed in the connecting portion 913. These six hole portions H1, H2, and H3 are formed so as to be in parallel to an XZ plane, and to pass through the first extending portion 911, the second extending portion 912, and the connecting portion 913. In addition, these six hole portions H1, H2, and H3 are configured so that the legs FT detached from the device 10 are capable of being connected thereto. That is, the six hole portions H1, H2, and H3 are equivalent to a fixing portion according to the invention.

An aspect in which the legs FT are attached to the hole portions H1 to H3 will be described later.

The reinforcement portion 92 connects the first extending portion 911 and the second extending portion 912 which constitute the main body 91, and reinforces the main body 91. Hole portions 921 and 922 equivalent to an attachment portion according to the invention are formed in the vicinity of both ends of the reinforcement portion 92. The screw S1 (see FIG. 8) is inserted into the hole portions 921 and 922. In the present embodiment, the screw S1 is inserted into a corresponding hole portion out of a plurality of hole portions 212 of the ceiling portion 21 of the device 10, and is threadedly engaged with the protruding portion 2E211 of the metal frame body 2E. Thereby, the reinforcement portion 92 is fixed onto the +Y direction side of the device 10.

The plate-like portions 93 to 96 are provided on the four corners CR1 to CR4 of the main body 91, respectively. Specifically, the plate-like portion 93 is a plate-like portion having a substantially rectangular shape which extends out from the corner CR1 in the +Y direction and extends out to the inner side of the corner CR1, and is bonded to the corner CR1. In addition, the plate-like portion 94 is a plate-like portion having a substantially rectangular shape which extends out from the corner CR2 in the +Y direction and extends out to the inner side of the corner CR2, and is bonded to the corner CR2. Further, the plate-like portion 95 is a plate-like portion having a substantially rectangular shape which extends out from the corner CR3 in the +Y direction and extends out to the inner side of the corner CR3, and is bonded to the corner CR3. Additionally, the plate-like portion 96 is a plate-like portion having a substantially rectangular shape which extends out from the corner CR4 in the +Y direction and extends out to the inner side of the corner CR4, and is bonded to the corner CR4.

That is, when the handle 9 is attached to the device 10, such plate-like portions 93 to 96 are provided at positions corresponding to the corners of the ceiling portion 21 and the bottom portion 22 of the device 10, respectively. In addition, hole portions 931, 941, 951, and 961 equivalent to the attachment portion according to the invention are formed in these plate-like portions 93 to 96, respectively. The screw S1 (see FIG. 8) is inserted into these hole portions 931, 941, 951, and 961.

Attachment Aspect of Handle (First Attachment Aspect)

The screw S1 is inserted into a corresponding hole portion out of the plurality of hole portions 212 of the ceiling portion 21 of the device 10, and is threadedly engaged with the protruding portions 2E211 and 2E221 of the metal frame body 2E. Thereby, the four points of the main body 91 are fixed to the ceiling portion 21 in conjunction with two points of the reinforcement portion 92. Therefore, the handle 9 is reliably attached to the ceiling portion 21 of the device 10.

An aspect in which the handle 9 is attached to the ceiling portion 21 of the device 10 is set to the first attachment aspect (see FIG. 1) of the handle 9, and attachment aspects different from the first attachment aspect will be described below.

Second Attachment Aspect

Figure 8:
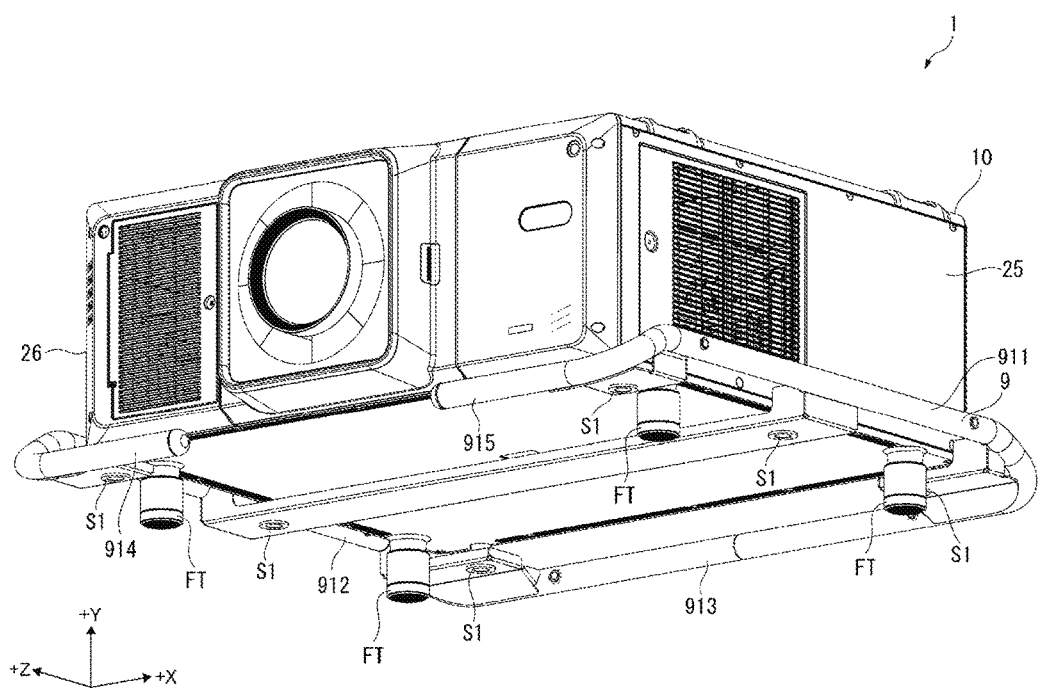
FIG. 8 is a perspective view illustrating a projector having a handle attached to the bottom portion of the device according to the embodiment.

FIG. 8 is a perspective view illustrating the projector 1 in which the handle 9 is attached to the bottom portion 22.

As shown in FIG. 8, the handle 9 is fixed to the bottom portion 22 of the device 10 constituting the projector 1. This handle 9 is attached to the bottom portion 22 in a state of being toward a direction opposite to the direction of attachment to the ceiling portion 21. Therefore, when the handle 9 is attached to the bottom portion 22 of the device 10, the connecting portion 913, the third extending portion 914, and the fourth extending portion 915 are set so as to be located closer to the −Y direction side (position away from the device 10) than the first extending portion 911 and the second extending portion 912. In other words, the vicinities of the four corners CR of the main body 91 are set so as to be located closer to the −Y direction side than the first extending portion 911 and the second extending portion 912.

Thereby, since a gap between the device 10, and the connecting portion 913, the third extending portion 914 and the fourth extending portion 915 becomes larger, a region having the large gap is easily grasped by a plurality of users.

In addition, the first extending portion 911 of the handle 9 is located in the vicinity of the left side portion 25 of the device 10, and the second extending portion 912 is located in the vicinity of the right side portion 26 of the device 10.

Therefore, when the projector 1 is seen from the +X direction side, the first extending portion 911 and the second extending portion 912 are configured not to overlap the legs FT. In addition, the connecting portion 913, the third extending portion 914, and the fourth extending portion 915 are set so as to be located closer to the +Y direction side than the installation surface of the projector 1. For these reasons, it is possible to easily execute the rotation operation of the legs FT from the right and left side portions 25 and 26 sides, and to easily set the position of a projection image which is projected from the device 10.

Third Attachment Aspect

Figure 9:
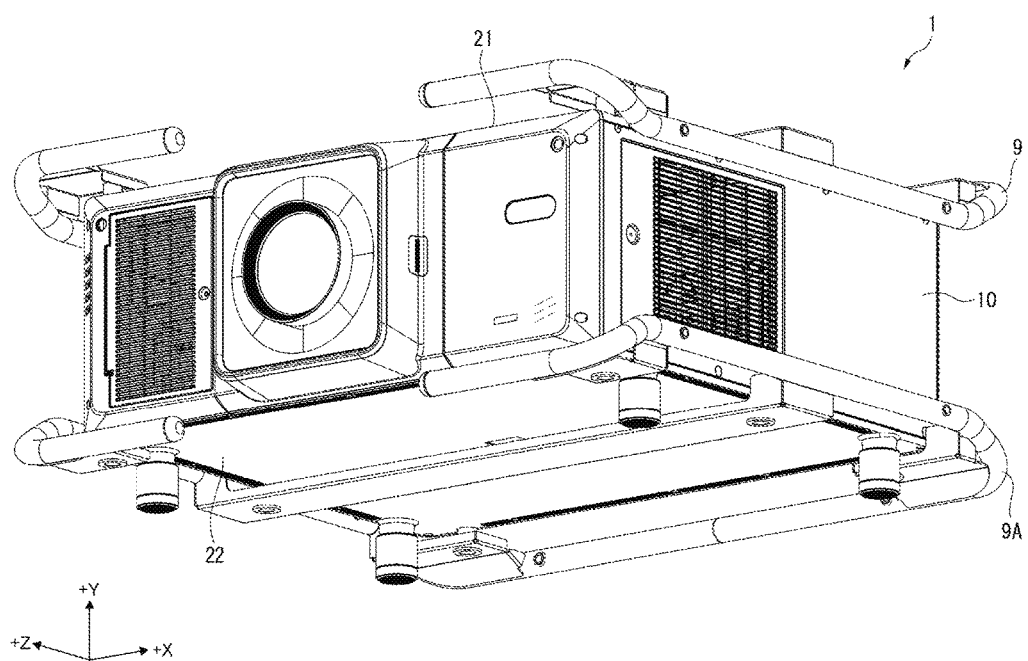
FIG. 9 is a perspective view illustrating a projector having a handle attached to the ceiling portion and the bottom portion of the device according to the embodiment.

FIG. 9 is a perspective view illustrating the projector 1 in which two handles 9 and 9A are attached to the ceiling portion 21 and the bottom portion 22 of the device 10, respectively.

As shown in FIG. 9, the handle 9 and the handle 9A having the same shape as that of the handle 9 are attached to the ceiling portion 21 and the bottom portion 22 of the device 10 constituting the projector 1, respectively. In this manner, the handle 9 and the handle 9A are attached onto the +Y direction side and the −Y direction side of the device, and thus a user can grasp any one or both of the handles 9 and 9A, thereby allowing the projector 1 to be easily transported. In addition, since a portion capable of being grasped by a user becomes about two times larger, for example, four or more persons can transport the projector 1 by grasping the handles 9 and 9A.

Fourth Attachment Aspect

Figure 10:
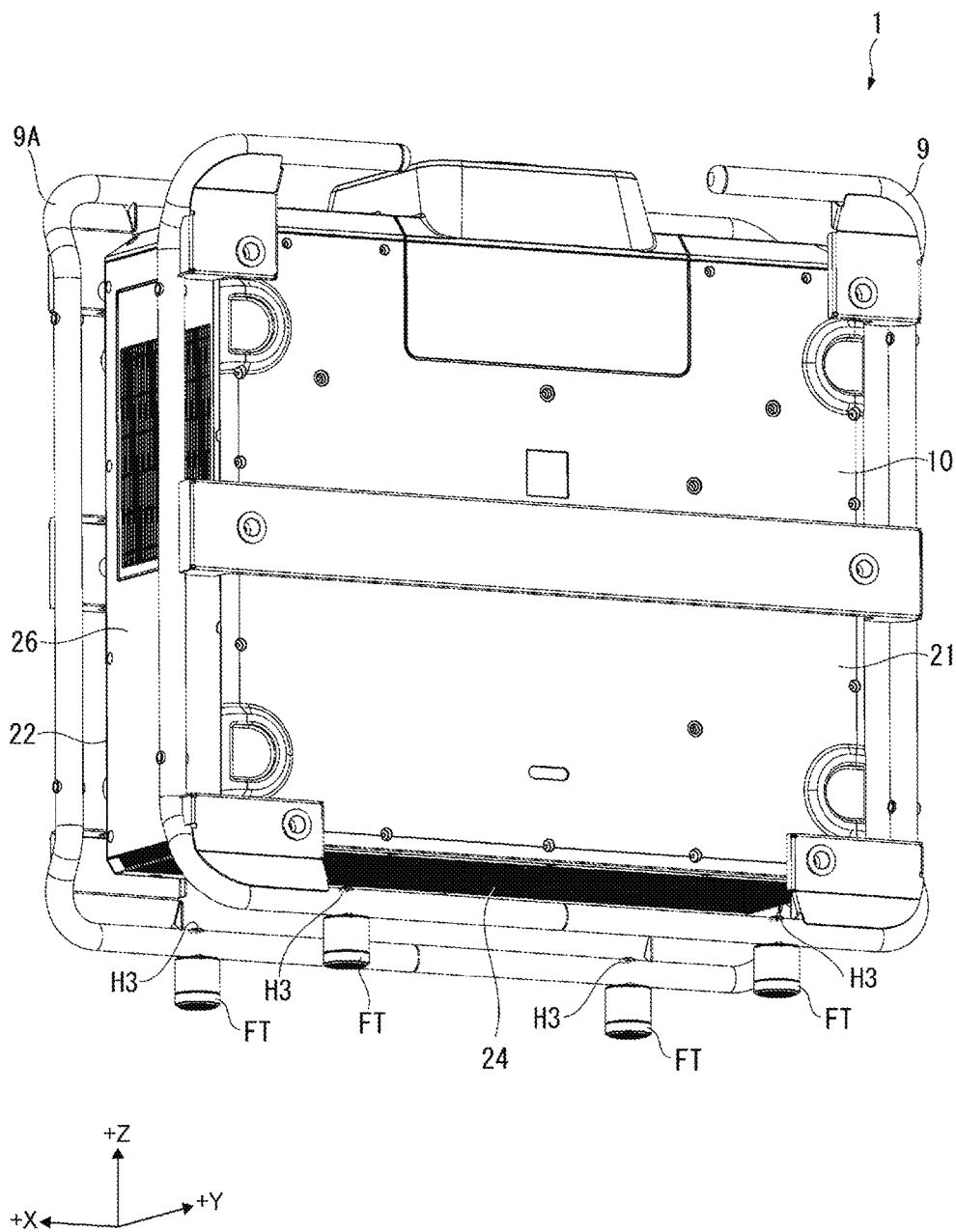
FIG. 10 is a perspective view illustrating a state where legs of the device are attached to the handle of the projector shown in FIG. 9.

FIG. 10 is a perspective view illustrating the projector 1 in which two handles 9 and 9A are attached to the ceiling portion 21 and the bottom portion 22 of the device 10, respectively, and the legs FT are attached to these handles 9 and 9A.

As shown in FIG. 10, the handle 9 and the handle 9A are attached to the ceiling portion 21 and the bottom portion 22 of the device 10, respectively, constituting the projector 1. In addition, each of the legs FT detached from the device 10 is threadedly engaged with each of the hole portions H3 of the handle 9 and the handle 9A. Therefore, the projector 1 is configured such that the back portion 24 and the installation surface are disposed so as to face each other, and that the legs FT come into contact with the installation surface. Thereby, the projector 1 is stably installed on the installation surface, and a projection image which is projected from the projector 1 is projected onto the opposite side of the installation surface.

Fifth Attachment Aspect

Figure 11:
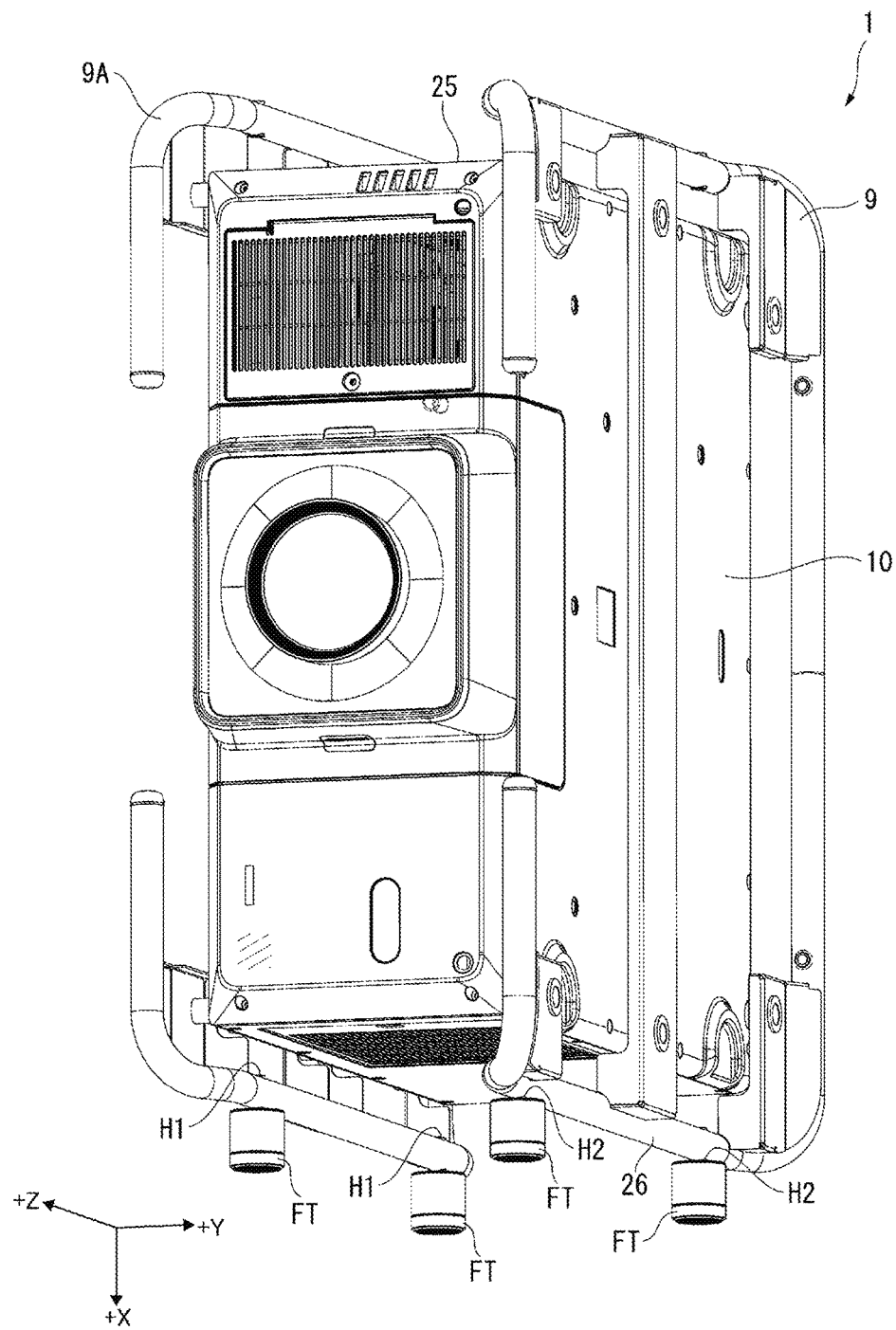
FIG. 11 is a perspective view illustrating a state where legs of the device are attached to the handle of the projector that performs portrait projection.

FIG. 11 is a perspective view illustrating the projector 1 in which two handles 9 and 9A are attached to the ceiling portion 21 and the bottom portion 22 of the device 10, respectively, and the legs FT are attached to these handles 9 and 9A.

As shown in FIG. 11, the handle 9 and the handle 9A are attached to the ceiling portion 21 and the bottom portion 22 of the device 10, respectively, constituting the projector 1. In addition, each of the legs FT detached from the device 10 is threadedly engaged with each of the hole portions H2 of the handle 9 and the hole portions H2 of the handle 9A. Therefore, the projector 1 is configured such that the left side portion 25 and the installation surface are disposed so as to face each other, and that the legs FT come into contact with the installation surface. Thereby, the projector 1 is stably installed on the installation surface, and a projection image which is projected from the projector 1 is projected in substantially parallel to the installation surface, and in a state of being rotated by 90° (so-called portrait projection) as compared to a case of the first to third attachment aspects.

Configuration of Projection System

Figure 12:
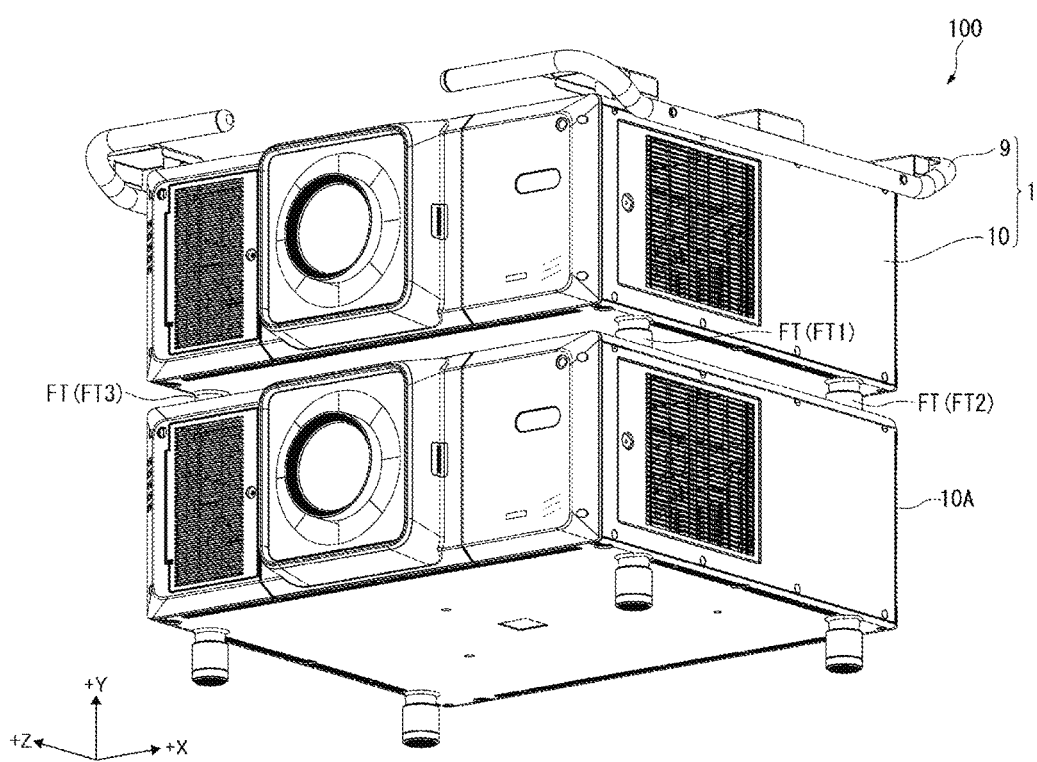
FIG. 12 is a perspective view illustrating a projection system according to the embodiment.

FIG. 12 is a perspective view when a projection system 100 according to the present embodiment is seen from the +Z direction side.

The projection system 100 is configured by the projector 1 being stacked on the ceiling portion 21 of the device 10. In such a projection system 100, beams of image light emitted from the projection optical device 36 of the device 10A and the projection optical device 36 of the projector 1 are superimposed on the screen SC1.

Method of Stacking Projector

Such a projection system 100 is stacked using, for example, a method described below.

For example, after the device 10A is installed on a predetermined installation surface, a plurality of users (for example, four users) grasp the handle 9 (vicinities of the corners CR1 to CR4 of the handle 9) attached to the ceiling portion 21 of the device 10 to lift the projector 1, and maintains the device 10A so as to be substantially upright. Next, the outer edge of the device 10 on the legs FT1 and FT2 sides is inclined so as to become the bottom, and the legs FT1 and FT2 of the device 10 are engaged with the upright standing portions 211A and 211B of the ceiling portion 21 in the device 10A by sliding the upper portions of the areas Ar1 and Ar2 surrounded by the upright standing portions 211A and 211B in the −X direction. That is, since only the legs FT1 and FT2 of the projector 1 are engaged with the upright standing portions 211A and 211B (located in the areas Ar1 and Ar2), the projector 1 in the state is configured such that the right side portion 26 is located closer to the +Y direction side than the left side portion 25.

In a state where only the legs FT1 and FT2 of the projector 1 are engaged with the upright standing portions 211A and 211B, when a user moves the projector 1 in the −Y direction (moves the right side portion 26 of the projector 1 to the −Y direction side), the legs FT3 and FT4 of the bottom portion 22 come into contact with the inclined surface 2112 of the upright standing portions 211C and 211D in the ceiling portion 21 of the device 10A, and come into contact with the areas Ar3 and Ar4 of the ceiling portion 21 by sliding the inclined surface 2112. Thereby, the projector 1 is stacked on the ceiling portion 21 of the device 10A, and the movement of the legs FT1 to FT4 of the projector 1 is regulated by the upright standing portions 211A to 211D of the device 10A.

In the present embodiment, the projector 1 is configured to be stacked on the device 10A, but a projection system in which a plurality of projectors are stacked may be configured without being limited thereto. That is, the handle 9 may be separately attached to the device 10A, and in this case, the handle 9 may be mounted on the bottom portion 22 of the device 10A.

Effects of Embodiment

The projector 1 according to the present embodiment described above exhibits the following effects.

When the handle 9 is mounted on the device 10 of the projector 1 by the attachment portion of the handle 9, the first extending portion 911, the second extending portion 912, and the connecting portion 913 are located in three different directions of the device 10, respectively, and thus a plurality of users (for example, three or more users) can grasp the first extending portion 911, the second extending portion 912, and the connecting portion 913 which are located in the three directions. According to this, even in a case where the weight of the device 10 of the projector 1 is, for example, equivalent to one or more adults, three or more users can grasp and transport the handle 9, and thus the device 10 of the projector 1 can be easily transported.

In addition, the device 10 is provided with the projection optical device 36, and the handle 9 is mounted on the device 10 so that the projection optical device 36 is located on the opposite side of the connecting portion 913. Therefore, a case does not occur in which the main body 91 of the handle 9 is located in the projection direction of the projection optical device 36, and thus it is possible to reliably project a projection image projected from the projection optical device 36 onto a projection surface such as the screen SC1.

Further, the reinforcement portion 92 is included which connects the first extending portion 911 and the second extending portion 912 constituting the main body 91, and reinforces the main body 91, and thus it is possible to further improve the durability of the main body 91 and the handle 9 than in a case where the reinforcement portion 92 is not present.

Since four curved portions 9111, 9112, 9121, and 9122 provided in the main body 91 are curved in a direction separated from the device 10, a gap between the curved portions 9111, 9112, 9121, and 9122 and the device 10 becomes larger. According to this, a plurality of users grasp portions having the large gap (for example, connecting portion 913, third extending portion 914 and fourth extending portion 915), and thus can easily transport the device 10 (projector 1) of the projector 1.

In addition, since the curved portions 9111, 9112, 9121, and 9122 are disposed at positions closer to the center side than the end of the main body 91, a user can grasp positions closer to the end side (connecting portion 913, third extending portion 914, and fourth extending portion 915) than the curved portions 9111, 9112, 9121, and 9122, and thus the handle 9 can be easily grasped.

Further, the legs FT are provided on the bottom portion 22 of the device 10 of the projector 1, the handle 9 is fixed to the bottom portion 22, and the curved portions 9111, 9112, 9121, and 9122 are located in the vicinity of the end of the device 10. Therefore, positions at which the curved portions 9111, 9112, 9121, and 9122 are not provided are located in the vicinities of the bottom portion 22 and the lateral side portions 25 and 26 of the device 10. Therefore, the legs FT provided on the bottom portion 22 of the device 10 can be easily rotated by a user from the positions at which the curved portions 9111, 9112, 9121, and 9122 of the device 10 are not provided.

In a case where the handles 9 are mounted on the ceiling portion 21 and the bottom portion 22 of the device 10, respectively, the legs FT can be mounted on the respective handles 9. In this case, for example, when upward projection, portrait projection or the like is executed in the projection direction of the device 10, the legs FT are mounted in regions that come into contact with the installation surface of the main body 91, and thus it is possible to stably project a projection image from the device 10.

Since the handle 9 is fixed to the metal frame body 2E, it is possible to more reliably fix the handle 9 to the device 10, for example, than in a case where the handle 9 is fixed to the exterior housing 2 constituted of a synthetic resin or the like. Therefore, it is possible to suppress damage to the exterior housing 2 during transport of the device 10, release from fixation between the device 10 and the handle 9, and damage to the device 10 due to its falling or the like.

In addition, since the handle 9 is attached to at least any one of the ceiling portion 21 and the bottom portion 22 of the device 10, it is possible to select a position at which the handle 9 is mounted, in accordance with the application of the projector 1. That is, in the present embodiment, it is possible to configure the projector 1 in various aspects, and to easily transport the projector 1, as shown in the first mounting aspect to the fifth mounting aspect.

Modification of Embodiment

The invention is not limited to the embodiment, and modifications, improvements and the like within a range capable of achieving the object of the invention are included in the invention.

In the embodiment, two extending portions 911 and 912 of the main body 91 are configured to have a shape extending out in the +Z direction in parallel to each other. However, the invention is not limited thereto. For example, as long as each of the two extending portions 911 and 912 has a shape extending out in substantially the same direction, the extending portion may extend out in a slightly different direction.

In the embodiment, the main body 91 is configured to be provided with four curved portions 9111, 9112, 9121, and 9122, and the curved portions 9111, 9112, 9121, and 9122 are configured to be curved in a direction separated (direction away) from the device 10. However, the invention is not limited thereto. For example, any one or two of the curved portions 9111, 9112, 9121, and 9122 may be provided. That is, as long as any one curved portion is provided, a gap between any of the curved portions 9111, 9112, 9121, and 9122 and the device 10 becomes larger, and thus a portion having the large gap can be easily grasped by a user. In addition, the curved portions 9111, 9112, 9121, and 9122 may not be provided, and five or more curved portions may be provided.

In the embodiment, the main body 91 is configured to have a substantially U-shape. However, the invention is not limited thereto. For example, the main body 91 may be substantially quadrangular in shape. In this case, it is also possible to exhibit the same effect as that of the handle 9 according to the embodiment.

In addition, in the embodiment, the curved portions 9111, 9112, 9121, and 9122 are configured to be provided on both ends of each of two of the first extending portion 911 and the second extending portion 912. However, the invention is not limited thereto. For example, the curved portion may be provided at any position of the main body 91. In this case, a gap between the curved portion and the device 10 becomes larger, and thus it is also possible to exhibit the same effect as that of the embodiment.

In the embodiment, the device 10 is configured to include a plurality of legs FT, and the main body 91 of the handle 9 is configured to include a plurality of hole portions H1, H2, and H3 as the fixing portion that fixes the legs FT. However, the invention is not limited thereto. For example, the device 10 may not include each of the plurality of hole portions H1, H2, and H3. In this case, the fixing portion that fixes the legs FT may be separately included instead of the plurality of hole portions H1 to H3. In addition, even in a case where the legs FT are not attached, the first extending portion 911, the second extending portion 912, and the connecting portion 913 which constitute the main body 91 of the handle 9 have a shape extending onto a substantially straight line, and thus can be installed on the installation surface, for example, in a state where the handle 9 and the handle 9A are mounted on any of the ceiling portion 21 and the bottom portion 22.

In the embodiment, the metal frame body 2E is configured to be provided within the exterior housing 2. However, the invention is not limited thereto. For example, the metal frame body 2E may not be provided. In this case, an area in the ceiling portion 21 and the bottom portion 22 in which the handle 9 is attached may be made larger in thickness dimension than other portions. In this case, it is also possible to reduce the occurrence of distortion of the exterior housing 2. In addition, the metal frame body 2E may not be constituted of a metal.

In the embodiment, four upright standing portions 211A to 211D are configured to be provided. However, the invention is not limited thereto. For example, only any of the upright standing portions 211A to 211D may be provided, two upright standing portions out of the upright standing portions 211A to 211D may be provided, and three upright standing portions out of the upright standing portions 211A to 211D may be provided. In addition, the upright standing portion may not be provided.

In the embodiment, each of the upright standing portions 211A to 211D has a shape along a portion of the circumference of the legs FT of another projector 1A. However, the invention is not limited thereto. For example, the upright standing portion 211 may have a shape which is not along a portion of the circumference of the legs FT. That is, as long as the movement of the legs FT can be regulated, the upright standing portion 211 can have any kind of shape.

In the embodiment, the upright standing portion 211 is configured to have a shape (substantially semicircular shape) of being open toward the outer edge of the ceiling portion 21. However, the invention is not limited thereto. For example, the upright standing portion 211 may be formed in a doughnut shape. In this case, when another projector 1A is stacked on the ceiling portion 21 of the projector 1, the legs of the another projector 1A may be installed so as to be fitted into areas surrounded by the doughnut-shaped upright standing portions. In this case, as compared to the embodiment, it is possible to further reliably regulate the movement of the legs FT of another projector 1A, and to reliably regulate the movement of another projector 1A.

In the embodiment, each of the upright standing portions 211A to 211D is configured to be provided along the outer edge of the ceiling portion 21. However, the invention is not limited thereto. For example, each of the upright standing portions 211A to 211D may be disposed further inside than the outer edge of the ceiling portion 21. In this case, the legs FT of another projector 1A may also be disposed at positions corresponding to the upright standing portions 211A to 211D which are disposed inside. In addition, in this case, the metal frame body 2E may have a shape corresponding to areas surrounded by the upright standing portions 211A to 211D in which the legs FT are installed.

In the embodiment, the ceiling portion 21 and the bottom portion 22 are configured to have a substantially rectangular shape. However, the invention is not limited thereto. For example, the ceiling portion 21 and the bottom portion 22 may have a circular shape, and may have an elliptical shape. That is, the shapes of ceiling portion 21 and the bottom portion 22 may be any kind of shape.

In the embodiment, the upright standing portions 211A and 211B are configured to be provided on the end of the ceiling portion 21 on the +X direction side, and the upright standing portions 211C and 211D are configured to be provided on the end thereof on the −X direction side. However, the invention is not limited thereto. For example, any of the upright standing portions 211A to 211D may be configured to be provided only on any of the end on the +X direction side or the end on the −X direction side.

In the embodiment, the upright standing portions 211A to 211D are configured to include the inclined surface 2112 which is inclined from the outer side of the exterior housing 2 toward the inner side thereof with increasing distance from the ceiling portion 21. However, the invention is not limited thereto. For example, each of the upright standing portions 211A to 211D, or some of the upright standing portions may not include the inclined surface 2112.

In each of the embodiments, the color synthesis device 35 is configured to be constituted by a so-called cross dichroic prism. However, the invention is not limited thereto. For example, the color synthesis device 35 may be constituted by any of a so-called gapless prism and a Phillips prism.

In each of the embodiments, the light modulation devices 34 (34R, 34G, and 34B) are used. However, the invention is not limited thereto. For example, a reflection-type light modulation device may be used instead of the transmission-type light modulation devices 34 (34R, 34G, and 34B). In this case, color separation and color synthesis may be executed by the color synthesis device 35 without providing the color separation device 32.

In the embodiment, the projector 1 is configured to include three light modulation devices 34 (34R, 34G, and 34B), but the invention is not limited thereto. That is, the invention can also be applied to a projector using two or less or four or more light modulation devices.

In addition, in a case of a light modulation device capable of forming an image based on image information by modulating a flux of incident light, a device using a micromirror, for example, light modulation devices other than a liquid crystal such as a device using a digital micromirror device (DMD) may be used.

In the embodiment, the device 10 (projector) is illustrated as a device to which a grasping tool such as the handle 9 is attached. However, the invention is not limited thereto. For example, the device to which the grasping tool is fixed is not limited to a projector, and may be any kind of device as long as a portable apparatus is used.

What is claimed is:

1. A grasping tool which is attached to a device, the tool comprising:
   a main body which is provided with two extending portions extending out in substantially the same direction and a connecting portion that connects respective one-side ends of the two extending portions; and
   a reinforcement portion that connects and reinforces the two extending portions at a position different from that of the connecting portion,
   wherein
   the main body and the reinforcement portion include an attachment portion that attaches the grasping tool to the device,
   the device includes a plurality of legs that come into contact with an installation surface, and
   the main body includes a fixing portion that fixes the plurality of legs detached from the device.

2. The grasping tool according to claim 1, wherein the main body includes a curved portion which is curved in a direction away from the device.

3. The grasping tool according to claim 2, wherein the device includes a metal frame body within an exterior housing, and
   the grasping tool is fixed to the metal frame body.

4. A projector comprising:
   a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 3, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

5. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 2, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

6. The grasping tool according to claim 1, wherein the device includes a metal frame body within an exterior housing, and the grasping tool is fixed to the metal frame body.

7. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 6, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

8. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 1, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

9. A grasping tool which is attached to a device, the tool comprising:

a main body which is provided with two extending portions extending out in substantially the same direction and a connecting portion that connects respective one-side ends of the two extending portions; and a reinforcement portion that connects and reinforces the two extending portions at a position different from that of the connecting portion, wherein
- the main body and the reinforcement portion include an attachment portion that attaches the grasping tool to the device,
- the device includes a metal frame body within an exterior housing, and
- the grasping tool is fixed to the metal frame body.

10. The grasping tool according to claim 9, wherein the main body includes a curved portion which is curved in a direction away from the device.

11. The grasping tool according to claim 10, wherein the device includes a plurality of legs that come into contact with an installation surface, and the main body includes a fixing portion that fixes the plurality of legs detached from the device.

12. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 11, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

13. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 10, wherein the exterior housing includes
- a bottom portion facing an installation surface of the projector, and
- a ceiling portion which is located on an opposite side of the bottom portion, and the grasping tool is attached to at least one of the ceiling portion and the bottom portion.

14. The grasping tool according to claim 9, wherein the device includes a plurality of legs that come into contact with an installation surface, and the main body includes a fixing portion that fixes the plurality of legs detached from the device.

15. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 14,
wherein the exterior housing includes
- a bottom portion facing an installation surface of the projector, and
- a ceiling portion which is located on an opposite side of the bottom portion, and the grasping tool is attached to at least one of the ceiling portion and the bottom portion.

16. A projector comprising:

a device which is provided with a light source device, a light modulation device that modulates light emitted from the light source device, a projection optical device that projects the light modulated by the light modulation device, and an exterior housing that receives the light source device, the light modulation device and the projection optical device; and the grasping tool according to claim 9,
wherein the exterior housing includes
- a bottom portion facing an installation surface of the projector, and
- a ceiling portion which is located on an opposite side of the bottom portion, and the grasping tool is attached to at least one of the ceiling portion and the bottom portion.

* * * * *